US006409946B1

(12) United States Patent
De Nardi et al.

(10) Patent No.: US 6,409,946 B1
(45) Date of Patent: Jun. 25, 2002

(54) HIGH-PRODUCTIVITY SINGLE-STAGE METHOD AND APPARATUS FOR PRODUCING CONTAINERS MADE OF THERMOPLASTIC MATERIAL

(75) Inventors: Ireneo De Nardi, Cordignano; Alberto Armellin, Vittorio Veneto; Luigi Rodighiero, Montebelluna; Nicola Da Riol, Porcia, all of (IT)

(73) Assignee: Sipa S.p.A., Vittorio Veneto (IT)

( * ) Notice: Subject to any disclaimer, the term of this patent is extended or adjusted under 35 U.S.C. 154(b) by 0 days.

(21) Appl. No.: 09/367,656

(22) PCT Filed: Jun. 22, 1998

(86) PCT No.: PCT/EP98/03793

§ 371 (c)(1),
(2), (4) Date: Aug. 20, 1999

(87) PCT Pub. No.: WO99/01267

PCT Pub. Date: Jan. 14, 1999

(30) Foreign Application Priority Data

Jul. 3, 1997 (IT) .......................................... PN97A0039

(51) Int. Cl.[7] .......................... B29C 49/64; B29C 49/78
(52) U.S. Cl. ....................... 264/40.6; 264/535; 264/237; 425/143; 425/160; 425/526; 425/533; 425/534
(58) Field of Search ................................ 264/40.6, 520, 264/535, 537, 237; 425/143, 160, 526, 533, 534, 548, 552

(56) References Cited

U.S. PATENT DOCUMENTS

| 4,242,073 A | * 12/1980 | Tsuchiya et al. ............. 425/149 |
| 4,261,949 A | * 4/1981 | Spurr et al. .................. 264/535 |
| 4,470,796 A | * 9/1984 | Stroup et al. ................ 425/526 |
| 5,468,443 A | * 11/1995 | Takada et al. ............... 264/537 |
| 5,589,114 A | * 12/1996 | Evans ........................ 264/40.6 |

FOREIGN PATENT DOCUMENTS

JP          0566995 A1  *  10/1993   ........... B29C/49/06

* cited by examiner

Primary Examiner—Robert Davis
Assistant Examiner—Joseph S Del Sole
(74) Attorney, Agent, or Firm—Pearne & Gordon LLP (57) ABSTRACT

A method and system for providing for the production of preforms of thermoplastic resin by filling a plurality of multiple-cavity molds with molten resin for forming the preforms, holding and cooling down the molten resin inside the molds, removing the molded preforms from the molds, subjecting the preforms to a subsequent temperature conditioning stage, and transferring the preforms to a blow-molding stage. Each of the multi-cavity molds includes a plurality of cavities defined in several distinct clusters and each cavities belonging to the same cluster is cooled in a distinct and differentiated manner with respect to the cavities belonging to other clusters provided in the same mold.

19 Claims, 6 Drawing Sheets

HIGH-PRODUCTIVITY SINGLE-STAGE METHOD AND APPARATUS FOR PRODUCING CONTAINERS MADE OF THERMOPLASTIC MATERIAL

BACKGROUND OF THE INVENTION

The present invention refers to an improved method and apparatus for the large-scale production of containers made of a thermoplastic material, such as in particular polyethylene terephtalate (PET) and polypropylene (PP), intended for applications involving their being filled with liquids that may be also at quite elevated temperature and/or contain $CO_2$ (carbon dioxide) gas.

In the field of technologies and machines for producing containers of the above cited kind there are a number of developments and improvements aimed at obtaining, on the one side, increasingly robust and improved containers, capable of being used for both hot-filled liquids and carbonated beverages, and, on the other side, production processes and related apparatuses that are capable of manufacturing said containers in an increasingly reliable, cost-effective, versatile manner to increasingly high quality standards in a highly competitive industrial context of very large-scale production.

Such production processes are generally known to be able to be schematically divided into two basic typologies, ie. single-stage and two-stage processes.

The features and characteristics that are typical of said processes, and differentiate them from each other in terms of both equipment and operation, are largely known to all those skilled in the art, so that no need arises here to dwell on them any longer.

Inherent to any single-stage process there is the fact that an uneven heat distribution is unfailingly brought about in the cross-sectional direction of the wall thickness of the preform when the latter is removed from the related cavity in the mold into which the molten resin had been injected.

Various processes have been actually patented, which cover time and temperature parameters of the preform when this is removed from the injection mold, in view of optimizing the related cycle times.

All patent literature covering single-stage processes discloses almost invariably a final forming or molding stage of the container of thermoplastic material which is in some way or other carried through a conditioning station to reach an even wall temperature throughout the cross-section of the same wall, said temperature corresponding to the preferred molecular orientation temperature of the thermoplastic resin involved.

A currently most preferred technique involves the use of a process of continuous extrusion of a flow of molten resin so as to sequentially fill a plurality of molds, such as this is described in the following patent specifications:
GB 767,164
FR 2.089.154
FR 2.114.455
U.S. Pat. No. 4,242,073.

Furthermore, owing to the difference existing between the time requirements for the injection molding/cool-down phase and the blow-molding phase, which usually requires a time that may be even four times shorter than the one involved in the previous phase, the practice is also largely known which consists in using, in a single-stage apparatus, a number of blow-molding molds which is a whole multiple of the number of corresponding injection-molding molds, so as to compensate in this way for the difference existing in the time requirements of the two phases. These phases, in fact, are unavoidably organized in series, with a greater number of injection-molding molds in such a manner as to produce performs in such quantities and at such a rate as to fully saturate the utilization of the blow-molding molds.

The patent specifications U.S. Pat. Nos. 4,261,949 and 4.313,720, both to Emhart Industries Inc., totally self-explaining and descriptive in this connection.

The above cited teachings, i.e. the continuous extrusion in a plurality of multiple molds, associated to a combination of blowing molds which are in a number that is a multiple of the number of the corresponding injection molds, have been brought together, and generally improved and illustrated, in the U.S. Pat. No. 4,372,910 and its divisional U.S. Pat. No. 4,470,796 to Stroup, while a preferred embodiment thereof has been implemented in a single-stage injection-blow molding apparatus of Van Dorn Plastic Machinery generally disclosed in said U.S. patent to Stroup.

Said U.S. Pat. No. 4,372,910 (along with its divisional) essentially describes and claims a process and apparatus for the production of hollow plastic products, typically bottles.

As compared with the prior-art, the therein disclosed invention covers a single-stage extrusion process for producing preforms that are successively stretched and blown into the final or finished product. Said extrusion process includes the possibility of carrying out a continuous extrusion, wherein the molten material is fed in sequence into a plurality of preform-molding molds. The process is organized in such a manner that, when the extruded melt is being fed into a mold, e.g. the first one of a set of molds, the other molds are closed by appropriate valves actuated in a sequence. Once said first mold has been filled, the same is closed, while a second mold is opened to be in turn filled by the flow of extruded melt. This sequence goes on until all of the molds in the set have been filled, after which the process is started again from the first mold that has in the meantime transferred its preforms to the respective blow-molding station.

The sequence in which the valves are actuated is such as to ensure that the molten material is absorbed, i.e. taken up almost constantly, so that the extrusion process takes place continuously, i.e. without interruptions, with clear operational and practical advantages.

One of the most significant advantages claimed in the above cited patent lies in the fact that, considering that the preform molding operation takes a considerably longer time, which quite often is a multiple of the time required by the subsequent blow-molding operation, it is nor necessary to wait, at the end of a blow-molding operation, for a subsequent preform molding operation to reach its conclusion (which thing would lead to a fully inadequate efficiency level of the blow-molding station), since through a multiplication in parallel and a process for cyclically feeding a plurality of preform molding molds which in turn are adapted to feed a plurality of blow-molding stations, a better utilization of the whole production plan is allegedly obtained.

Another advantage is claimed to lie in the fact that the continuous extrusion process contributes to a further improvement in the utilization of the plant, so that the combination of the various elements described in the above cited patent would conclusively lead to a drastic improvement in the overall production efficiency.

However, the invention disclosed in the above cited patent has in practice a number of drawbacks that tend to limit the extent of the claimed advantages: some of such drawbacks are described in the Italian patent no. 1 265 567, filed by the Applicant, to which reference is therefore made here for the sake of brevity. Anyway, they essentially relate to the problems that are typically brought about to the resin filling and compression operations performed by the same resin extruder, as well as the therewith associated problems brought about by the resin undergoing shear stress, i.e. frictioning, and hence generating acetaldehyde.

Further drawbacks, which generally come afloat in plants with a high output capacity, derive from the fact that an increase in the number of cavities in each mold, an increase in the number of the same molds and therefore an increase in the total volume and, hence, in the cost of the molds, along with an increase in the cost of the control apparatuses that have to be associated therewith, when added to an increase in the length and the diameter of the extruder and, as a result, in the related costs and production and logistic complexity, lead to overall charges that are no more sustainable, even in front of an altogether moderate increase in output capacity.

Furthermore, the greater total number of mold cavities provided in such plants require a correspondingly high flow of molten resin to be processed by the extruder and this of course requires the use of an extruder with a correspondingly large diameter. It has however repeatedly been found that, in such a kind of extruders, the film of resin that tends to spread out on the inner walls of the extrusion barrel, and fails to be directly pushed forward by the screw, actually picks up a no more negligeable thickness and, owing to the type of path to be covered when moving towards the cavities, it tends to particularly concentrate in some cavities, while neglecting other ones.

Considering now that such a resin moves forward at a slower rate and is in direct contact with the heating walls, it ensues that it is heated up with a greater intensity due to the combinded effect of the longer dwelling time in the extruder and said contact with the heating wall; such a greater and sensible overheating effect tends to generate a considerable amount of acetaldehyde that concentrates, along with said fraction of resin, just in said determined cavities.

In conclusion, preforms are in this way produced in which there is a concrete risk of releasing acetaldehyde in amounts that are clearly beyond the allowable limits set by the applying regulations.

From the disclosure in the European patent EP 0 071 258 to Valyi, the teaching is also known according to which the preform is allowed to rapidly cool down in the injection mold until its temperature sinks below the point to which the highest crystallization rate for the given plastic material corresponds. The same preform is then quickly removed from the injection mold while it still has an uneven distribution of its temperature, and transferred to a holding station provided between the injection mold and the conditioning station so as to allow the heat content of the preform to keep changing until an average temperature suitable for the orientation is reached, thereby setting the injection mold free for the next preform molding operation and, therefore, reaching a shorter cycle time while preserving the basic properties of the bottle to be produced.

Such a teaching, however, involves the addition of a supplementary holding station, i.e. mold with all associated drawbacks of an economic nature that this implies and all related production complications deriving from the construction of such a mold along with the therewith associated insertion, removal, ejection, driving and control means.

BRIEF SUMMARY OF THE INVENTION

Based on the above considerations, it therefore is a main purpose of the present invention to provide a single-stage process and apparatus for the production on an industrial scale of a container of thermoplastic resin which is thermally stable, capable of being filled with both hot and carbonated liquids wherein a higher output is ensured with a smaller number of molds while doing away with the afore described economic and technical drawbacks.

Such an apparatus shall furthermore be fully reliable and easily implemented with the use of known, readily available techniques.

Such main aim of the present invention, along with further features of the present invention, is reached in a method to mold bottles of thermoplastic material through the use of a sensibly reduced number of preform molding molds in which the number of cavities are increased and the preforms produced in such cavities are removed therefrom in clusters that are conveyed to an appropriate blow-molding station in an orderly sequence and, therefore, according to a definite holding or waiting procedure.

In order to prevent the preforms from cooling down in a differentiated manner, and therefore in a manner that is not appropriate in view of a correct blow-molding process, during said holding period, the various preform clusters are cooled down, when still in the related mold cavities, in an intentionally differentiated manner aimed at ensuring that all preforms, when inserted in the blow-molding dies, exhibit the same, optimal temperature.

BRIEF DESCRIPTION OF THE DRAWINGS

These and further aims and advantages of the present invention will anyhow be more readily and clearly understood by those skilled in the art from the description that is given below. The invention itself may be implemented by definite parts and/or arrangements thereof, a preferred embodiment of which is described and illustrated below by way of non-limiting example with reference to the accompanying drawings, in which.

DETAILED DESCRIPTION OF THE INVENTION

When reference is made to the accompanying drawings, which are only used to illustrate some preferred embodiments of the present invention and shall therefore not be intended as limiting the scope thereof, it can by noticed that the basic peculiarity of the present invention lies essentially in the combination of two distinct measures, the first one of which consists in providing the injection mold 1, in which the preforms are molded, with a plurality of cavities 2 that must be grouped into a number n of clusters, or sub-groups, namely the clusters of cavities belonging to and identified by the same line A, B . . . N containing preferably an identical number of cavities, as this is shown symbolically in FIG. 1.

So far there would actually be nothing really new with respect to the prior art, since all cavities contained in a single mold can be divided into clusters or sub-groups, e.g. in a number of n, wherein each cluster is arranged to contain a smaller number of cavities, without on the other hand bringing about, by this mere fact, any actual invention and/or advantage of any kind.

Figure 1:
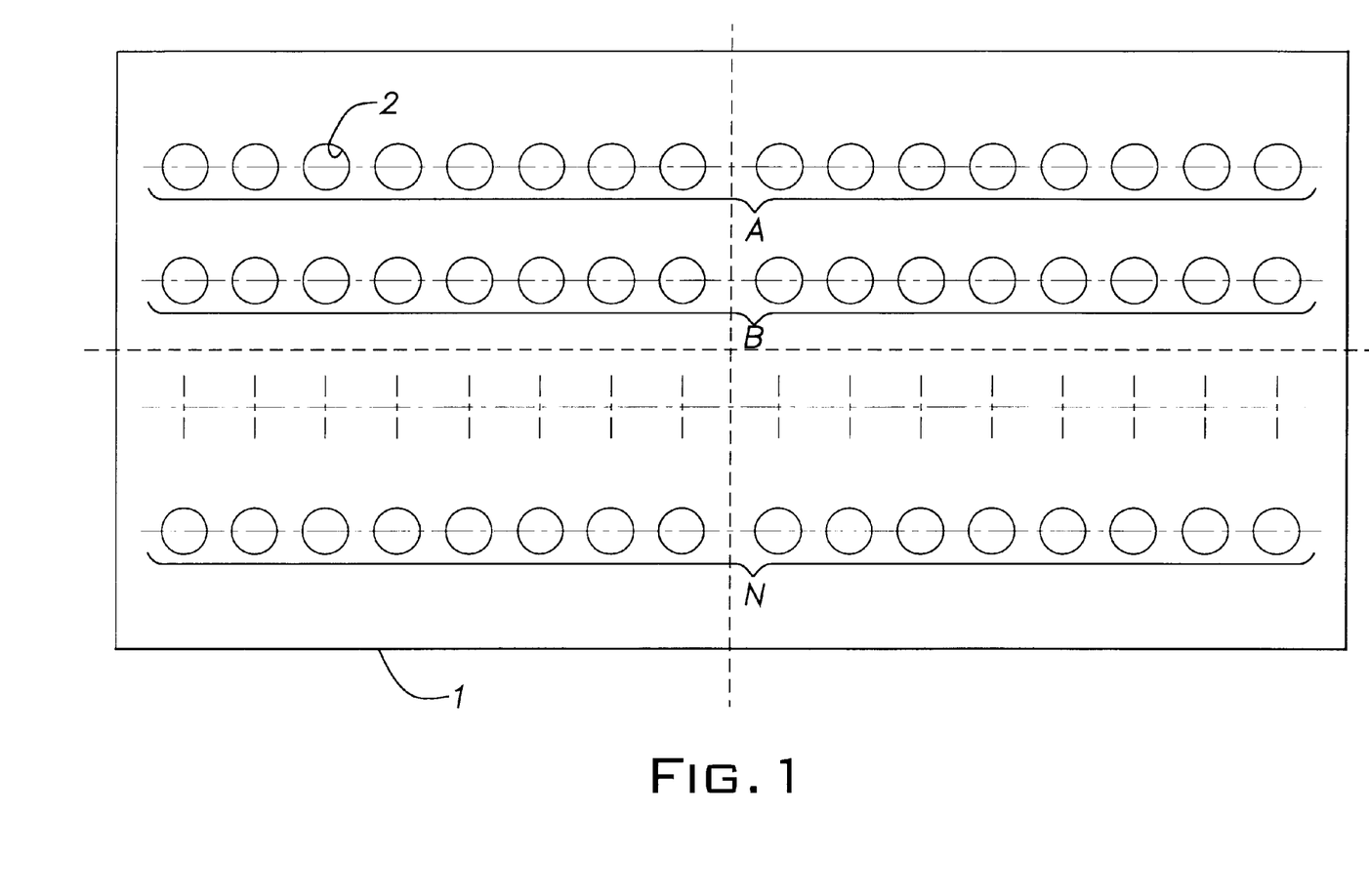
FIG. 1 is a basic, schematical view of a mold of an apparatus according to the present invention.

Such a measure is advantageously and innovatorily completed by implementing a cool-down system, along with all related means and devices, inside the mold in such a manner as to enable it to cool down each one of said n clusters of cavities in a differentiated manner, as appropriately selected according to the needs, during the phase in which the molten resin cools down and solidifies in the mold cavities, in such a manner that, when the preforms are removed from their respective cavities of the respective mold, they exhibit a different temperature, as this is clearly induced by the dissimilarity in the cool-down temperature of each respective cavity, said temperature being of course the same for all preforms belonging to a same cluster, but varying from one cluster to the other ones.

In both the preceding part and the following one of this description, "mold" is generally cited as a singular term, but it will of course be appreciated that any such mold is actually formed by two respective mold halves that must be opened in view of enabling the therein molded preforms to be removed.

Going now back to the moment in which the preforms are removed from a same mold these preforms are removed from there at the same time and exhibit, as this has already been stressed, a selectively differentiated temperature.

The second one of the two aforementioned measures consists in moving the various clusters of the so obtained preforms through an orderly holding and forward conveyance sequence on a cluster-by-cluster basis, as this is described in greater detail below.

Figure 2:
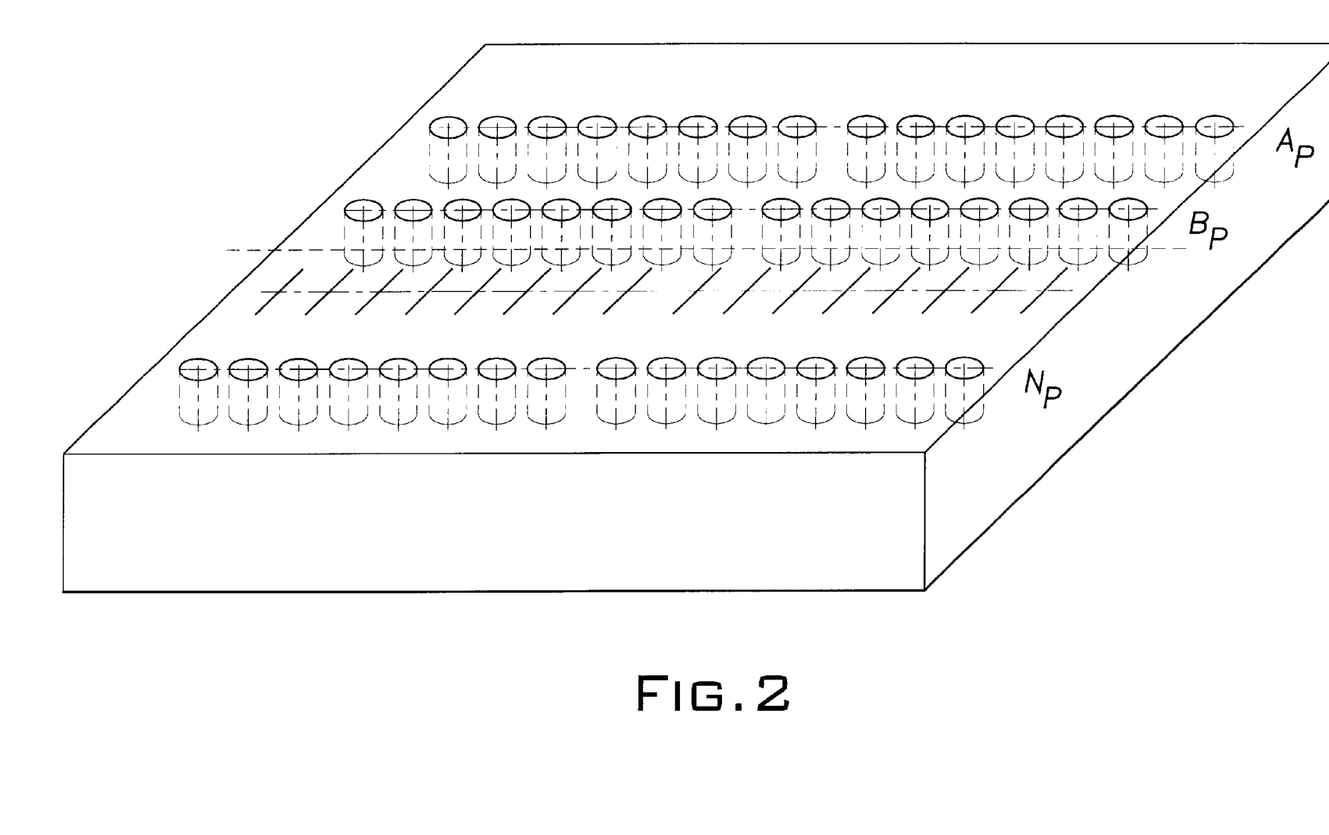
FIG. 2 is a view of a possible configuration of the preforms removed from and placed above the mold shown in FIG. 1.

With reference to FIG. 2, it can be noticed that said clusters A, B . . . N of cavities produce corresponding clusters of preforms $A_p$, $B_p$ . . . $N_p$ that are shown to be clearly identified by the same reference letters in the cited Figure. Said clusters of preforms are sent in an orderly sequence, e.g. first the whole cluster $A_p$, then the whole cluster $B_p$, and so on up to the cluster $N_p$, to a common conditioning station 14 and, from here, according to the same initial sequence, to a common blow-molding station 20. In practice, all preform clusters are removed from the mold at the same time and then queued in a holding phase of the cycle, waiting for being conditioned by successive clusters. It is therefore quite a natural fact that, during the holding time, such preforms are subject to cooling down in a differentiated manner according to the length of actual waiting time, so that the longer such a waiting time, the greater said cool-down effect, wherein it should be noticed in this connection that, during such a holding period, the preforms are exposed to the ambient air at ambient temperature.

In view of obtaining the best possible qualitative result with said preforms, the conditioning phase must bring the final temperature of the same preforms to an exactly predetermined, stable value, regardless of the clusters which each such preform comes from, and since said conditioning phase has constant characteristics, also the temperature of the preforms undergoing such conditioning should be appreciably constant, regardless of the cluster which they come from or the moment in which their conditioning actually starts. In order to obtain such a result, and considering the above remarks about the normally occurring differentiation in the cool-down of the preforms according to the actual length of the holding time, it is necessary for the temperatures of the preforms, as they are just removed from the mold, to be differentiated to such an extent that their subsequent normal cooling down, which depends on the length of the holding time corresponding to the particular cluster of preforms, is capable of bringing the final temperature of said preforms, i.e. the temperature of said preforms at the beginning of the conditioning phase, exactly to the constant value $T°_c$ that is required for all preforms of all clusters, regardless of the respective position in the conditioning sequence and, therefore, of the length of the respective holding and, as a result, cool-down time.

As a result, the cooling down of the cavities must be aimed at enabling an appropriately differentiated temperature to be reached in the preforms when they are removed from the mold, and such a differentiation depends essentially on both the length of the holding time, during which said natural cool-down takes place, and the final temperature that must coincide with the initial temperature of the conditioning phase.

The present invention is therefore based on the condition of such differentiated cool-down of the mold cavities (and therefore a simultaneous removal of all preforms from the mold) with said preforms being then sent sequentially, on a cluster-by-cluster basis, to the conditioning phase, wherein said differentiated cool-down of the mold cavities is regulated so as to enable each preform to reach the conditioning phase, at the beginning thereof, at the same temperature, keeping the holding time and the resulting natural cool-down of each preform into due account.

Figure 6:
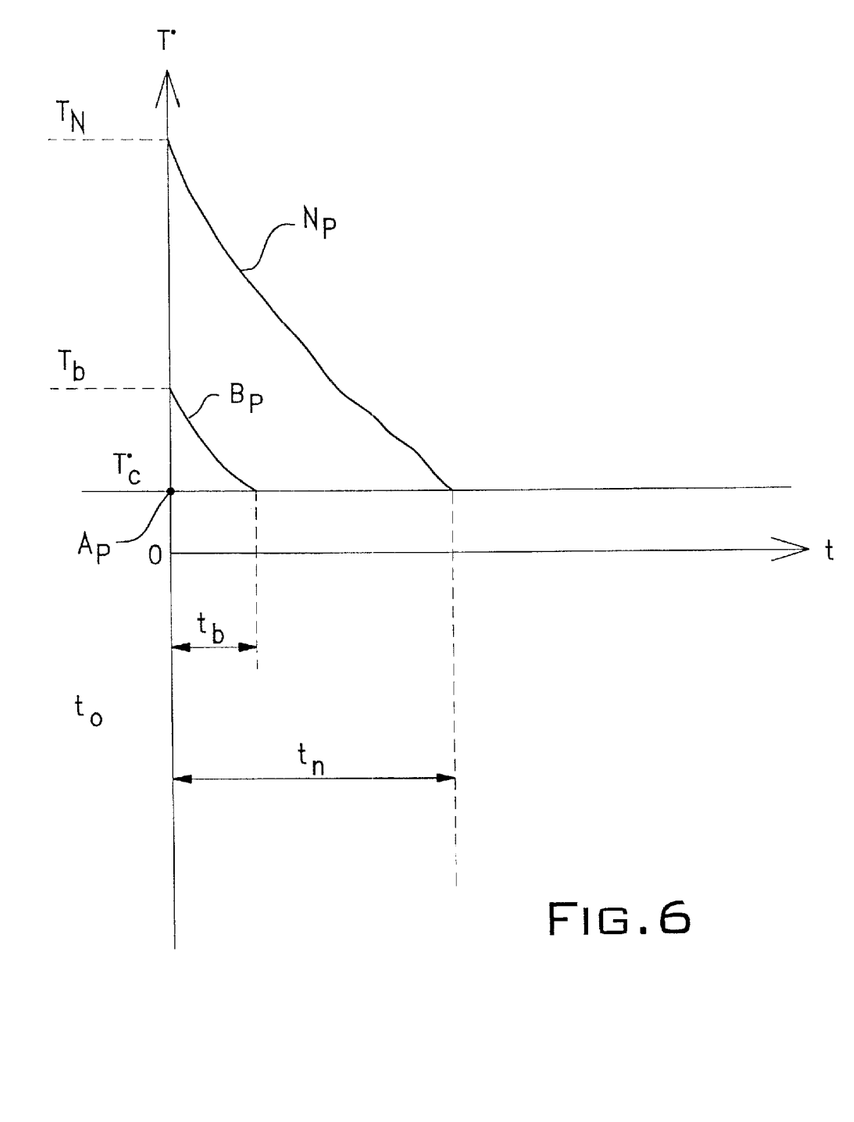
FIG. 6 is a view of a symbolic diagram showing the temperature pattern of distinct preform clusters after they have been removed at the same time from the same mold, said preforms having previously been cooled down in a differentiated manner.

To more effectively elucidate this aspect, let us now refer to the diagram illustrated in FIG. 6, where the holding time t of each cluster of preforms between their removal from the mold and the beginning of the conditioning phase is indicated in the abscissa, while the temperature $T°$ of the preform bodies upon their removal from the injection mold is indicated in the ordinate, $T°_c$ defines the temperature at which all preform clusters are when entering or beginning the conditioning phase, said conditioning process being of course equal for all preform clusters and equal being also the temperature at which said preform clusters enter the blow-molding stage of the process.

The various curves in the above cited diagram shall be intended as representing the temperature pattern in the distinct preform clusters $A_p$, $B_p$, . . . $N_p$, wherein for reason of greater simplicity said curves are identified by the same reference letters.

Since it is assumed that the temperature of the first preform cluster $A_p$ is exactly equal to the temperature $T°_c$ at which the same preform are required to be when entering the conditioning station, as this occurs in the traditional technique, then such first cluster $A_p$ does not need to go through any holding or waiting phase; as a result, the related temperature curve is identified by the point $A_p$ located in correspondence of the initial time $t_0$ and the temperature $T°_c$ at which the preforms are required to enter the blow-molding station.

The subsequent cluster of preforms $B_p$ must on the contrary undergo a holding phase for a time $t_b$ that is equivalent to the time needed by the cluster $A_p$ to go through the conditioning phase; during such holding time, the related preforms undergo a natural cool-down and must therefore be removed from the injection mold at a higher temperature $T_b$, in such a manner that, at the end of the respective holding time $t_b$, their temperature has steadied down at the same above defined level $T°_c$ required for the preforms to enter the blow-molding station.

The same occurs for the subsequent preform clusters . . . $N_p$, which, owing to their having to undergo holding phases through respectively and progressively longer periods . . . $t_n$, must of course come out of their injection mold at corresponding, progressively increasing temperatures . . . $T_n$, as this can be clearly inferred from the illustration in FIG. 6.

In the course of this description, the term preform cluster or cluster of preforms has been used and defined in the assumption that such clusters actually comprise a plurality of preforms, such assumption being on the other hand a logical one for all operation (i.e. mold unclamping, handling means, preform ejection/removal, transfer means and the like) to be duly and completely operated.

Under the above cited circumstances, owing to the above mentioned facts, it clearly emerges that the conditioning/blow-molding apparatuses carry out two operating cycles in the same time in which the complete preform injection molding/cool-down/removal operation goes through a single cycle, while, owing to the differences in the duration of the cycles preformed by the various apparatuses, the conditioning and blow-molding ones remain particularly still and unused for half of the time. It will appreciated that such an arrangement may therefore be particularly suitable when bottles must be produced at quite low output rates. In such cases, in fact even a relative inefficiency brought about by the above cited downtime problems can be accepted, since it is generally compensated by a considerable simplification in the overall construction of the equipment and a marked saving effect on general costs.

Figure 3:
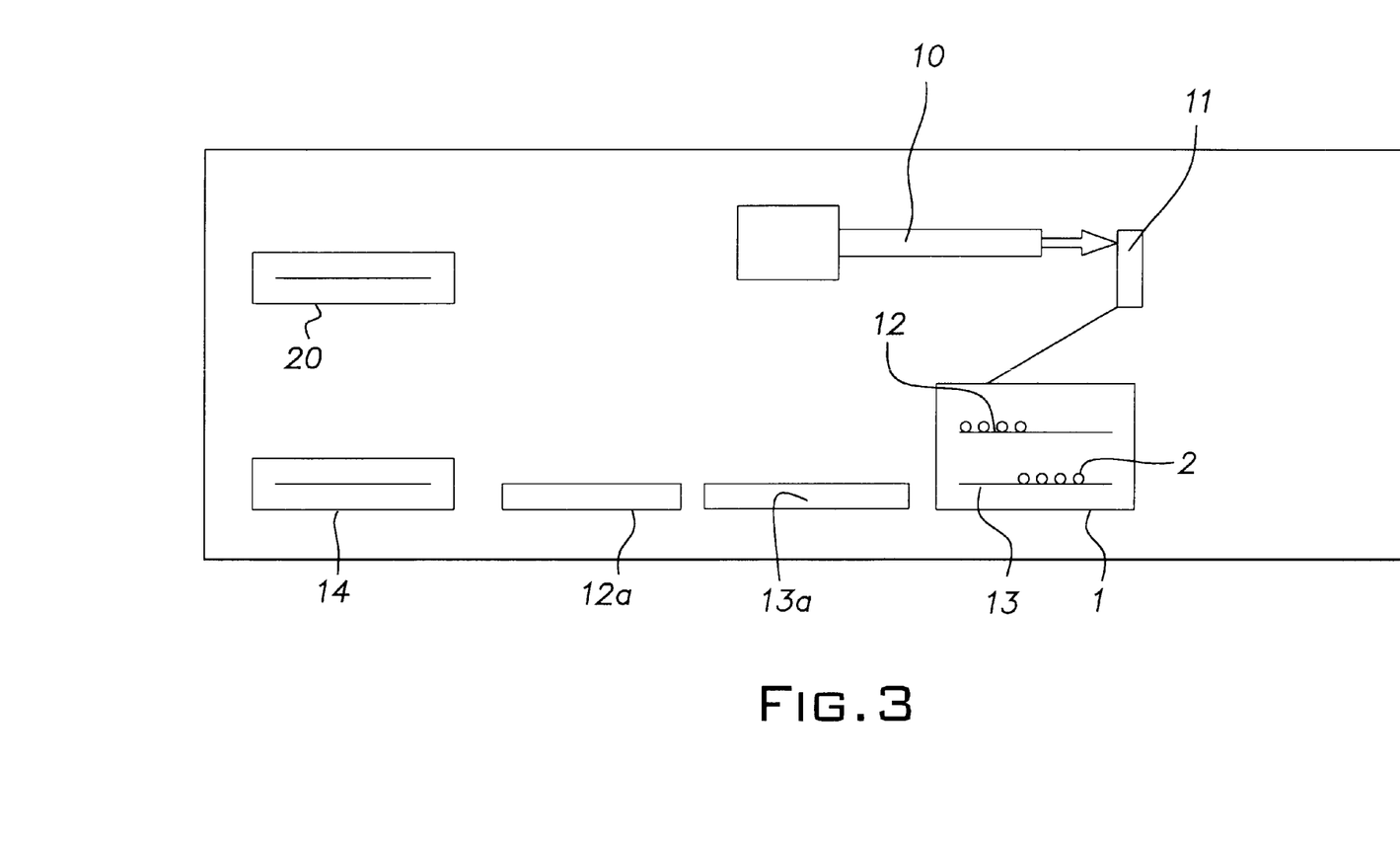
FIG. 3 is a basic, schematical view of an apparatus according to the present invention.
Figure 4:
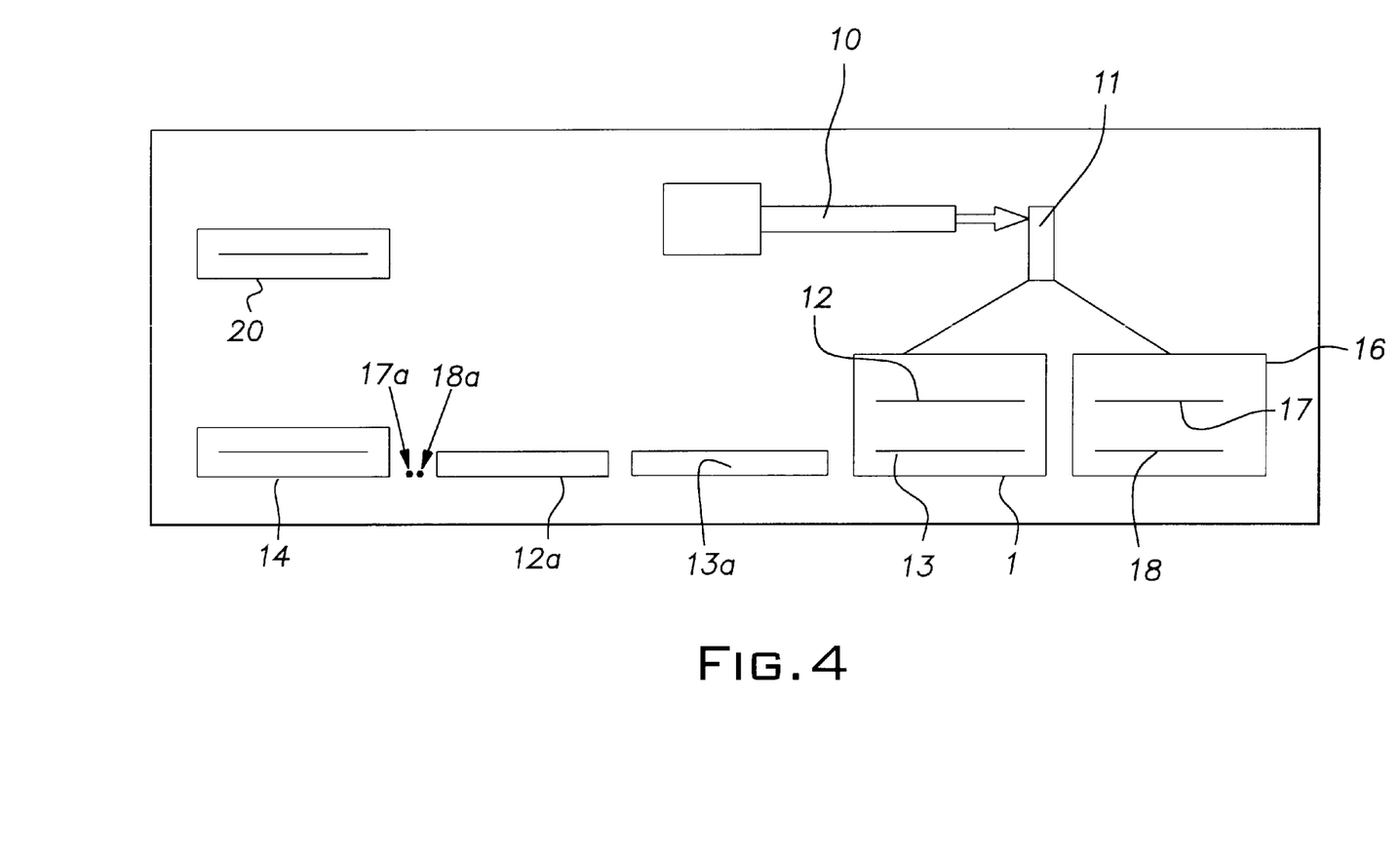
FIG. 4 is a view of an improved variant of the apparatus shown in FIG. 3.

However, in order to eliminate such an inefficiency due to downtimes, the configuration illustrated in FIG. 4 is advantageously proposed. Such a configuration differs from the one illustrated in FIG. 3 for the addition of a supplementary mold 16 that is fully similar to the afore described mold 1, including the two clusters of cavities 17 and 18, respectively, as well as for the addition of also two further holding sectors 17a and 18a, respectively, which are again fully similar to the afore described holding sectors 12a and 13a. Thanks to the explanations given above, those skilled in the art will now be capable of readily appreciating that, in this case, the conditioning and blow-molding apparatuses are in fact fully saturated, since after having processed four successive clusters of preforms produced in a row by the two molds, they are immediately available for processing four further clusters of preforms produced in the meantime by said two molds in a subsequent injection-molding operation.

Such a configuration appears to be particularly advantageous since it combines a marked improvement in productivity with an unaltered simplicity in the construction of the equipment, considering that the output capability thereof can be practically doubled simply through the addition of said supplementary mold 16, apart of course from the necessary adjustments and set-up requirements in connection with the related control and drive means.

It will also be readily appreciated that the greatest extent to which use can actually be made of the present invention, i.e. the multiplication of the number of clusters per each mold while at the same time making use of several molds, finds its technical and economic limit in the increasing complexity and in the related costs of the quite complex molds required, in the filling and interchangeability thereof, and in the necessary control and drive means. In principle, however, the invention does not find any conceptual limit.

As far as all the various control and drive means are concerned which are required to clamp and unclamp the molds, remove the preforms from said molds, convey and position the preforms of a same cluster in a handling means adapted to simultaneously transfer all such preforms to the conditioning and blow-molding stations, these are in all cases means that, although implementable in the most varied forms for operating according to the most varied principles, are fully within the capability of all those skilled in the art.

As far as the manners are concerned in which the various zones of a same mold are selectively cooled down in a differentiated way, they do not per sé fall within the actual scope of the present invention, since they can be implemented in a number of ways, the most simple one of which consists in providing, inside the body of the mold, a plurality of conduits, so as to in particular surround each single cavity therewith, wherein a medium is caused to flow through said conduits which is appropriately tempered under thermostatic control in accordance with the actual temperature to which the cavities associated to said conduits must be cooled.

In the course of extensive experiments on prototypes, it has however been found that the external variables, such as for instance the room temperature, the type of resin, the temperature at which such resin is injected in its molten state into the mold cavities, the thermal inertia of the mold and so on, can bring about a variation in the temperature of the preforms entering the conditioning station.

Figure 5:
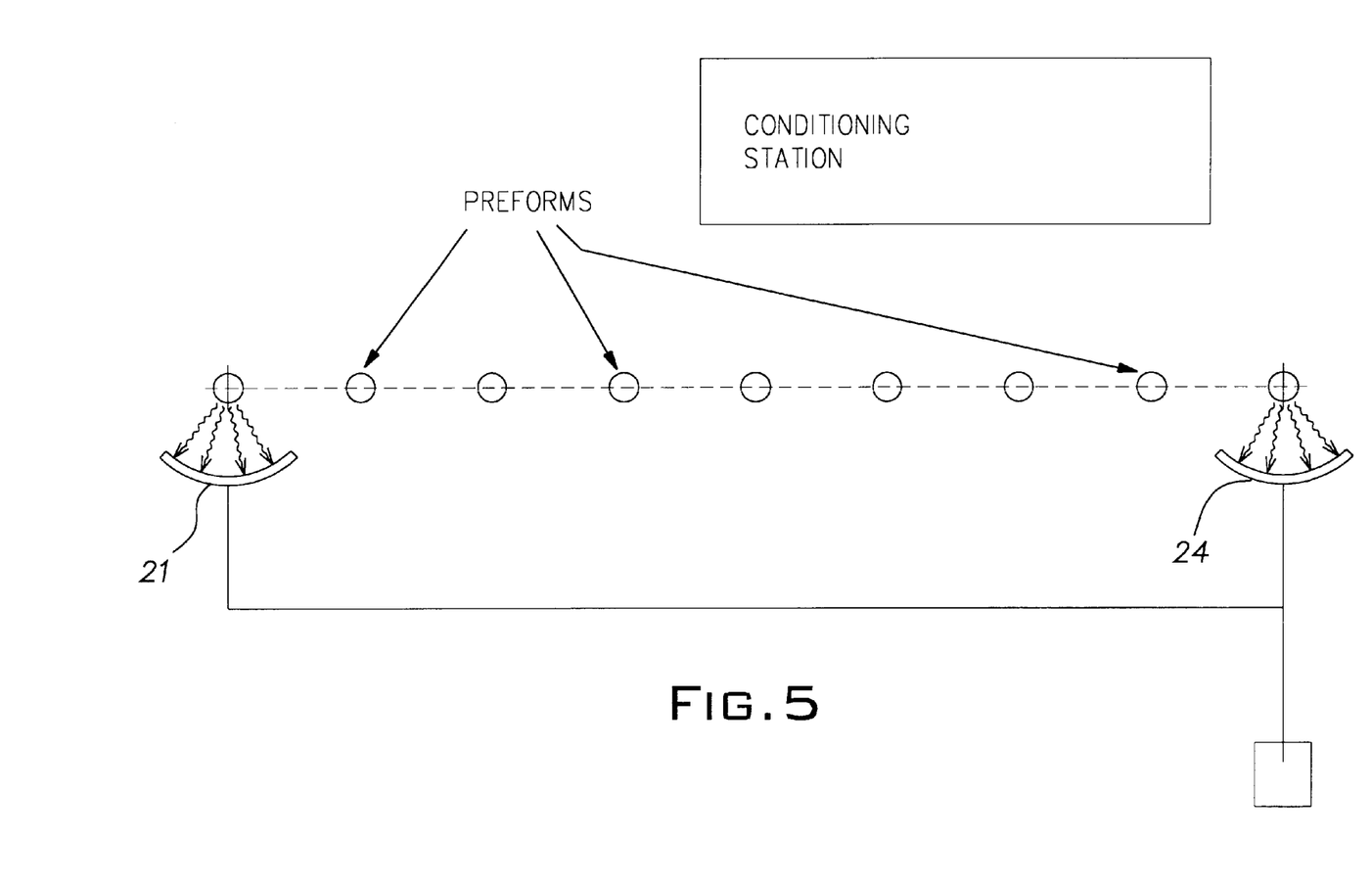
FIG. 5 is a view of a configuration of the means for detecting the temperature of the preforms before conditioning.

With reference to FIG. 5, such a drawback is therefore eliminated through a detection of the temperature of the preforms, before conditioning, by means of per sé known means 21, 22; according to such a temperature being detected to fall within or to be outside preset limits, feedback-operated means are adapted to respond accordingly by generally acting on the cooling means that are associated to the cavities of those molds from which the preforms have been removed whose temperature has in such manner been detected to be outside said pre-set limits.

In this manner, as soon as a deviation occurs in the temperature of the preforms from the accepted value, said means automatically intervene to modify the respective temperature accordingly.

The precision of such a deviation range, i.e. the extent to which the temperature may be allowed to deviate from the pre-set values, can of course be kept within very strict limits and, in any case, within the tolerance range inside which the temperature of the preforms can vary without any risk of it actually affecting the final molding result.

In order to improve the responsiveness to a deviation in the temperature of the preforms, as well as to enhance the uniformity in the temperature of the preforms belonging to a same cluster, it is advantageous for said means 21, 22 provided to detect the temperature of the preforms before the conditioning stage to be so arranged as to be able to detect the temperature of those preforms that are thermally most "spaced away" from each other, i.e. of that pair of preforms included in the same cluster, which are supposed to exhibit the greatest difference in temperature as compared to any other pair in the same cluster. It is well within the capabilities of those skilled in the art to identify, even by means of simple measurements, the cavities and, therefore, the pairs of preforms that exhibit such a property.

It will be appreciated that the invention can be implemented also with methods and apparatuses that differ from the above described ones, by complying substantially with the features and characteristics recited in the appended claims.

What is claimed is:

1. Single-stage method for the production of preforms of thermoplastic resin comprising the steps of:
   filling a plurality of multiple-cavity molds with molten resin for forming said preforms,
   holding and cooling down said molten resin inside said molds,
   removing the molded preforms from said molds,
   subjecting said preforms to a subsequent temperature conditioning stage,
   transferring said preforms to appropriate blow-molding tools and clamping them therein for their final stretch-blow molding operation,
   wherein each one of said multiple-cavity molds comprises a plurality of cavities defined in several (n) distinct clusters belonging to the same mold, said cavities being cooled down by means of a forced circulation of cooling medium through appropriate cooling conduits provided in the body of each such mold, wherein the cavities belonging to a same cluster are cooled in a distinct and differentiated manner with respect to the cavities belonging to the other clusters of cavities provided in the same mold.

2. Single-stage method according to claim 1, wherein the preforms of said clusters belonging to a same mold are removed at the same time from their respective cavities, wherein each such cluster of preforms is subjected individually to said temperature conditioning stage and the subsequent blow-molding phase.

3. Single-stage method according to claim 2, wherein said clusters of preforms are subjected individually to said temperature conditioning stage in an orderly sequence, so as to cause said clusters of preforms to queue up for reaching said temperature conditioning stage after a differentiated time $(t_b \ldots t_n)$.

4. Single-stage method according to claim 3, wherein to said temperature conditioning stage are sent the clusters of preforms produced by a single and same mold until all clusters of preforms of said mold are finished, and then the orderly sequence goes on with the preforms from distinct clusters of a respective remaining molds.

5. Single-stage method according to claim 1, wherein:
   the cavities in each mold are filled by an extruder adapted to successively send a flow of molten resin to a plurality of injectors associated to respective molds,
   upon having been so filled up, each such injector injects the therein contained molten resin into the therewith associated mold,
   upon having so filled up all said molds, said extruder is stopped at least until the preforms are removed from a mold and the latter is made ready to receive a new shot of molten resin.

6. Single-stage method according to claim 5, wherein, if the ratio of the time required to complete the blow-molding phase to the time required to complete the overall preform injection-molding phase is defined as K, a single blow-molding station adapted to simultaneously blow-mold a whole cluster of preforms is associated to a single preform molding mold containing a number of cavity clusters which is equal to the whole number that is immediately below said number K.

7. Single-stage method according to any of the preceding claims 3 to 6, wherein the preforms of successive clusters $(A_p, B_p, \ldots N_p)$ of the same mold are removed therefrom at differing temperatures $(T_o, T_b, \ldots T_n)$ which are such as to enable all such preforms to reach and stabilize at a substantially same and constant temperature value $(T^\circ_c)$ during differentiated holding periods thereof.

8. Single-stage method according to claim 7, wherein the temperature of at least a preform of each cluster of each mold is measured at the beginning of the temperature conditioning phase and, should such a temperature be detected as to fall outside pre-defined temperature limits, the cooling down of the cavities relating to said cluster is automatically varied in such a manner as to bring again the temperature of the preforms removed from said cavities within said limits.

9. Single-stage method according to claim 8, wherein the temperature that is taken as a reference for comparison with said pre-defined temperature limits is the average temperature of the temperatures of the pair of preforms belonging to a same cluster that exhibit the greatest difference in temperature as compared to any other pair of preforms in that same cluster.

10. Single-stage method according to claim 8, wherein the temperature of the preforms is measured immediately before said preforms are transferred to the temperature conditioning stage by means of infrared temperature-detection means.

11. Single-stage apparatus for the production of hollow bodies of plastic material comprising injection means, a first molding station equipped with at least a mold (1) provided with a plurality of cavities in which preforms are produced, a blow-molding station in which said preforms are blow-molded into their final shape of finished containers, an intermediate conditioning station (14) in which said preforms are conditioned in their temperature so as to be conferred an optimal temperature distribution pattern in view of the subsequent blow-molding phase, conveyor means adapted to transport in a sequential and orderly manner the preforms from said first molding station to said final blow-molding station through said intermediate conditioning station, wherein said cavities are adapted to be grouped into a plurality of clusters, each one of which is subject to individual and selectively operable means for cooling their respective cavities to a same temperature that differs from the temperatures associated to the cavities of all other clusters in the mold.

12. Single-stage apparatus according to claim 11, wherein said individual and selectively operable means provided to selectively cool down said cavities comprise a plurality of conduits provided in said molds (1) and associated to means adapted to cause a cooling medium to flow therethrough at an automatically controlled temperature.

13. Single-stage apparatus according to claim 11 or 12, wherein it is provided with handling and conveying means adapted to remove said preforms at the same time from the respective molds, to transfer said preforms sequentially and grouped into distinct clusters to said temperature conditioning and blow-molding stations, as well as means (12a, 13a, 17a, 18a) adapted to keep in their holding state the clusters of preforms as they wait for being transferred to said temperature conditioning station.

14. Single-stage apparatus according to claim 11, wherein said molds are in the number of two (1, 16), wherein each one of them is provided with two distinct clusters (12, 13; 17, 18) of cavities for preforms.

15. Single-stage apparatus according to claim 11, wherein it comprises an extruder (10) adapted to melt the resin that is eventually shot, possibly through appropriate injection means, into the cavities of said molds, wherein the operation of said extruder is stopped intermittently.

16. Single-stage apparatus according to claim 11, wherein it is provided with means (21, 22) adapted to detect the temperature of at least a preform of each cluster before the latter is transferred to the temperature conditioning station (14).

17. Single-stage apparatus according to claim 16, wherein it is provided with means adapted to act automatically on said individual and selectively operable means provided to selectively cool down the cavities whenever said temperature is detected to fall outside a pre-defined variation range.

18. Single-stage apparatus according to claim 16 or 17 wherein it is provided with means for detecting the temperature of two different preforms belonging to a same cluster and molded in respective pre-determined cavities, automatically calculating the average of the so detected temperatures, and to use such a calculated average temperature value as the reference value to be compared with said pre-defined temperature range.

19. Single-stage apparatus for the production of hollow bodies of plastic material comprising injection means, a first molding station equipped with at least a mold (1) provided with a plurality of cavities in which preforms are produced, a blow-molding station in which said preforms are blow-molded into their final shape of finished containers, an intermediate conditioning station (14) in which said preforms are conditioned in their temperature so as to be conferred an optimal temperature distribution pattern in view of the subsequent blow-molding phase, conveyor means adapted to transport in a sequential and orderly manner the preforms from said first molding station to said final blow-molding station through said intermediate conditioning station, characterized in that said cavities are adapted to be grouped into a plurality of clusters, each one of which is subject to individual and selectively operable means for cooling their respective cavities to a same temperature that differs from the temperatures associated to the cavities of all other clusters in the mold;

- wherein it is provided with means (21, 22) adapted to detect the temperature of at least a preform of each cluster before the latter is transferred to the temperature conditioning station (14);
- wherein it is provided with means adapted to act automatically on said individual and selectively operable means provided to selectively cool down the cavities whenever said temperature is detected to fall outside a pre-defined variation range;
- wherein it is provided with means for detecting the temperature of two different preforms belonging to a same cluster and molded in respective pre-determined cavities, automatically calculating the average of the so detected temperatures, and to use such a calculated average temperature value as the reference value to be compared with said pre-defined temperature range;
- wherein the temperature difference between said two different preforms is greater than the temperature difference between any other pair of preforms in the cluster.

* * * * *